Jan. 5, 1926.  
H. WORKMAN  
PROJECTION LAMP  
Filed Dec. 16, 1922  5 Sheets-Sheet 1

1,568,491

INVENTOR  
Harold Workman  
by Hubert A. Gill  
Attorney

Jan. 5, 1926.  1,568,491
H. WORKMAN
PROJECTION LAMP
Filed Dec. 16, 1922  5 Sheets-Sheet 2

INVENTOR
Harold Workman
by
Herbert A. Gill
Attorney

Jan. 5, 1926.  1,568,491

H. WORKMAN

PROJECTION LAMP

Filed Dec. 16, 1922   5 Sheets-Sheet 3

INVENTOR
Harold Workman
by Hubert A. Gill
Attorney

Jan. 5, 1926.  
H. WORKMAN  
PROJECTION LAMP  
Filed Dec. 16, 1922   5 Sheets-Sheet 4

1,568,491

INVENTOR  
Harold Workman  
by Hubert A. Gill  
Attorney

Jan. 5, 1926.  1,568,491
H. WORKMAN
PROJECTION LAMP
Filed Dec. 16, 1922   5 Sheets-Sheet 5

INVENTOR
Harold Workman
by Herbert A. Gill.
Attorney.

Patented Jan. 5, 1926.

1,568,491

UNITED STATES PATENT OFFICE.

HAROLD WORKMAN, OF GLASGOW, SCOTLAND.

PROJECTION LAMP.

Application filed December 16, 1922. Serial No. 607,328.

*To all whom it may concern:*

Be it known that I, HAROLD WORKMAN, a British subject, and resident of 12 University Gardens, Kelvinside, Glasgow, Scotland, have invented certain new and useful Improvements in Projection Lamps (for which I have filed applications in England, dated 9th January, 1922, and 4th October, 1922), of which the following is a specification.

This invention relates to light-projecting lamps of the paraboloidal reflector type, such as are used on motor vehicles, on locomotives passing through open country, and for various other purposes such as lighthouse illumination, or in searchlights and so forth. The glare produced in the eyes of persons approaching or approached by such lamps is due mainly to the concentrated beam of light reflected from the paraboloidal surfaces in a slightly upward direction, rather than to the direct light from the illuminant itself. The direct light from the electric lamp bulb or other source of illumination is diffused over a wide area in front of the lamp and such diffused light does not give any substantial glare effect. Many suggestions have been made for dividing up the paraboloidal reflecting surfaces into parts and disposing them in relation to the light source so as to direct the majority of the light downwardly, but none of the expedients suggested have had the effect of producing a wide band or zone of light with centres of intense illumination at the sides and upper margin of the beam, and this is the type of illumination which is the most desirable for the purpose in view. According to the present invention the paraboloidal reflecting surfaces are so disposed as to produce substantially flat-topped beams of light with zones of intense illumination at the upper margin of the beam, the reflecting surfaces being disposed with their axes substantially horizontal, but angularly displaced in respect to one another. In its simplest form the reflecting surface according to the invention is composed of two semi-paraboloids, the upper one with its focus at or about the rear end of the source of light, and the lower one with its focus at or about the front end of the source of light, the axes of both semi-paraboloids being horizontal, but one displaced angularly substantially about its focus so that its axis is at an angle to that of the other semi-paraboloid. This arrangement will produce, on a screen at a distance from the lamp, two semicircles of light each with its diameter horizontal and the zone of light spreading outwardly from the centre beneath the horizontal diameter, while the one semicircle is displaced laterally with respect to the other. The angle between the axes of the semi-paraboloids is preferably such that the illumination on a screen at the required range of vision, say about one hundred feet in front of the lamp, consists of two such semicircles of light partially overlapping one another. If, then, two headlamps are used on a vehicle, two of the semicircles may be arranged to coincide or nearly so, while the other two are to right and left respectively, thus providing a broad band of light which is most intense just at and below the horizontal plane through the lamp, and has two lateral zones of intense illumination which are useful for showing up the sides of a road, footpaths, hedgerows and so forth.

In other forms of the paraboloidal reflecting surfaces according to the invention, either one or both of the upper and lower partial paraboloids is or are divided into sections which are angled outwardly or inwardly as the case may be, so as to subdivide the beams of light into portions which give flat-topped zones of intense illumination at either side as well as near the centre of the light area projected from each lamp. The sections of the upper paraboloidal surfaces, if angled outwardly about their focus, may meet in a cusp on the median line at the front of the focus, or may be joined by a section of a paraboloid preferably with its axis in line with the axis of the lower paraboloidal surface or surfaces. In all cases according to the invention, however, all the partial paraboloids have their axes substantially horizontal, and only displaced relatively to one another in the horizontal plane. In the practical application of the invention I may use surfaces approaching a paraboloid, such as an ellipsoid or hyperboloid approximating to a paraboloid, or a surface made up of a series of tangential surfaces, facets or flues to a true paraboloid. The reflecting surface may be of polished metal, generally plated with silver or nickel, or it may be of silvered glass for example.

It will be convenient to describe the invention with reference to the accompanying drawings and diagrams which illustrate the principal forms of the reflecting surfaces, and the types of illumination which they are adapted to produce. In the drawings:—

Figure 1:
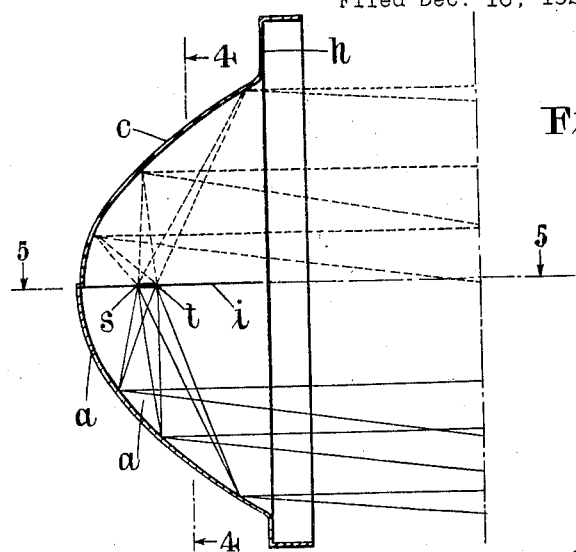
Figure 1 shows a paraboloidal reflector according to the invention with the bottom half consisting of a semi-paraboloid shown in central vertical section, and the upper half consisting of two outwardly angled partial paraboloids, in section along one of the divergent axes of its partial paraboloids.
Figure 2:
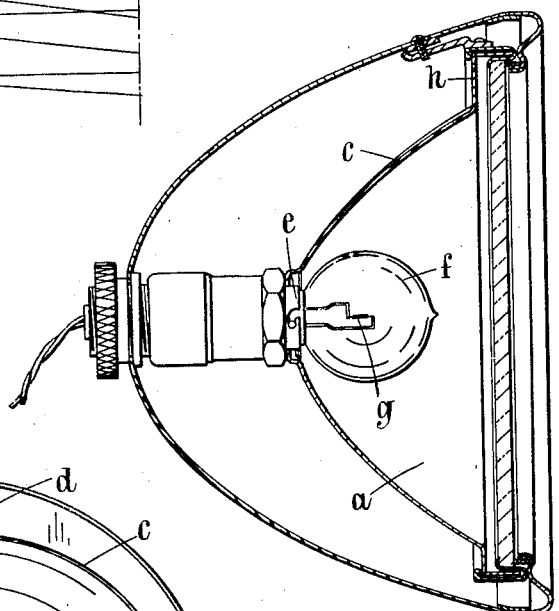
Figure 2 is a vertical section of a complete lamp containing the reflector of Figure 1.
Figure 3:
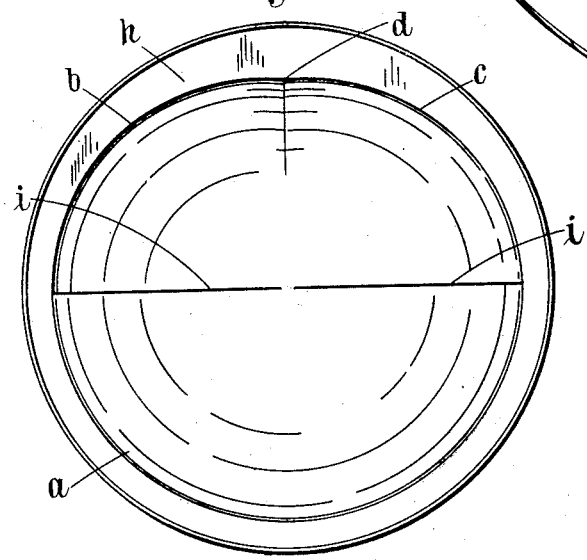
Figure 3 shows the reflector of Figure 1 in front elevation.
Figure 4:
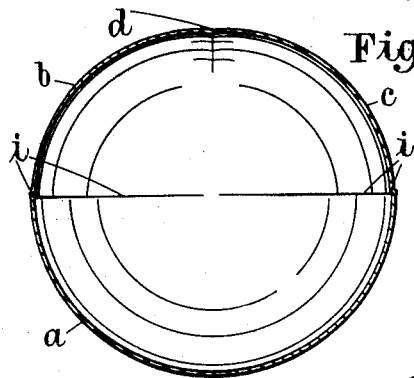
Figure 4 shows a transverse vertical section of the reflector on the line 4—4 of Figure 1.
Figure 5:
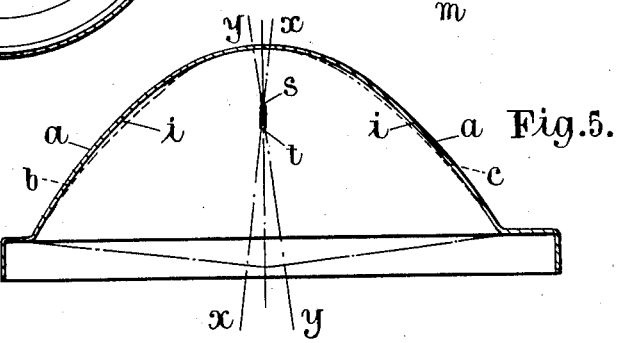
Figure 5 shows the reflector of Figure 1 in horizontal section on or just below the axis 5—5.

Referring first to Figures 1 to 5, it will be seen that the reflector shown has a lower half $a$ in the form of a half paraboloid with its focus at $t$, while the upper half of the reflector consists of two partial paraboloids $b$, $c$, of smaller size with their focus at $s$, and whose axes diverge on the lines $x$—$x$ and $y$—$y$ respectively, as seen in dotted lines in Figure 5, from the axis of the lower paraboloid $a$. The upper partial paraboloids are preferably arranged so that their horizontal lower edges register with the upper edges of the lower half paraboloid $a$ at the front corners of the reflector and as nearly as possible at its vertex as seen in Figure 5, but the registration of the edges at other points along the horizontal meeting plane is not exact. The slight shoulder or joggle at $i$ around the meeting edges in the horizontal plane is of no consequence in the operation of the reflector; it may be wiped out if preferred by slightly deforming the respective paraboloid surfaces at one or both sides of the joggle, though this is not generally necessary or desirable. At the top, owing to the outward angling of the partial paraboloids $b$ and $c$, their edges do not meet in a smooth curve, but they form an inwardly directed cusp as indicated at $d$ in Figure 3, at the part of the reflector in front of the focus $s$. This cusp becomes smaller in depth rearwardly until the point is passed above $s$, where the axes cross, behind which point the cusp tends to be in the outward direction. In the complete lamp seen in Figure 2, the socket $e$ is so arranged that the pillar filament $g$ in the lamp bulb $f$ lies in the line between the two foci $s$ and $t$ indicated in Figures 1 and 5. In order to complete the reflector at the front for insertion in a circular mount, a flange $h$ is formed around the upper front edges of the partial paraboloids $b$ and $c$, as seen in Figures 1 to 3. This is not essential of course, but is provided for convenience in mounting a reflector in a circular holder.

Although in Figure 2 the illuminant is shown as consisting of the lamp bulb with a single pillar filament $g$, yet it must be understood that any other suitable type of illumination may be used in which the illuminant is sufficiently concentrated in or close about the line between the points $s$ and $t$ in Figures 1 and 5. A suitable form of pillar filament is that which consists of a closely wound spiral of small diameter, say one-sixteenth of an inch, and a length of from three-sixteenths to three-eighths of an inch. Such a filament produces substantially the effect of a line of light between the points $s$ and $t$.

Figure 6:
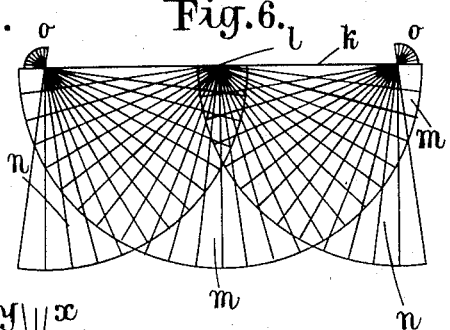
Figure 6 is a diagram showing the pattern of the reflected beam of light from a reflector as in Figures 1 to 5, as thrown on to a screen at a distance in front of the lamp.
Figure 8:
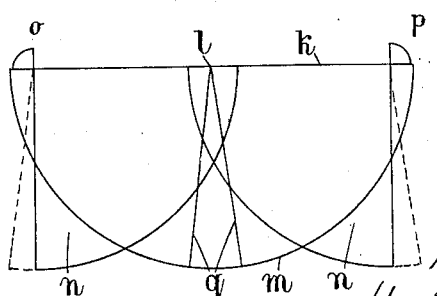
Figure 8 is a diagram similar to Figure 6, showing the change in the illumination due to the modification of Figure 7.

It will be realized that with a reflector made as hereinbefore described having its lower portion $a$ formed as a true half paraboloid with focus $t$, and its upper portion in the form of two outwardly angled partial paraboloids $b$ and $c$ which meet in a slight cusp or ridge $d$ on the vertical axial plane, and have a common focus $s$, and with the source of light disposed between the foci $s$ and $t$, the effect is that the beam of light thrown forward from the lower half of the reflector is in the form of a flat topped half cone of illumination which is most brilliant in the centre portion which illuminates the distant roadway. On the other hand, the light reflected from the upper half of the reflector will be roughly in the form of two flat topped partial cones of illumination, each approximately a quadrant or quarter of a circle in section, directed outwards along the axes x—x and y—y of the two partial paraboloids b, c, the light being most brilliant on the upper and outer portion of each quadrant and extending downwards and inwards towards the central axis of the reflector. There will also be a comparatively very small quadrant of light at each end above the horizontal axis k, as shown in Figs. 6 and 8. A light beam of this shape has not been produced before, and is of great value for the purpose in view. The formation of the zones of illumination as above described will perhaps be better understood from the following more detailed description: It will be seen by reference to Figure 1 that the light coming from the line between s and t, and reflected from various points on the surface of the lower paraboloid a, will be directed from the horizontal downwardly and outwardly. Light from the point t in fact, which is the focus of the paraboloid a, is reflected horizontally, while light from all points behind t and nearer to s is reflected downwardly and outwardly. In Figure 6, which shows the area of illumination for example on a screen placed at about 100 feet in front of the lamp, the line k represents the horizontal which the axis 5—5 of the lamp (Figure 1) meets at the point l in Figure 6. The semi-circle m beneath the horizontal line k represents the zone of illumination obtained from the lower half paraboloid a, assuming the upper half of the reflector to be absent or masked for the time being.

If instead of the partial paraboloids b and c angled out, another half paraboloid were used but set so that its focus was at s and its axis on the line 5—5 while the filament extended between s and t, it would simply produce a second semicircle of illumination superposed on the semicircle m. Such an arrangement would produce a comparatively intense illumination close around the point l, weakening toward the edges, but what is required in practice is a comparatively wide beam of light which shall be as flat topped as possible, while producing also good lateral illumination, with the most intense zones of lateral illumination at or just below the horizontal upper margin of the beam. The outward angling of the partial paraboloids b and c are made such that it results in a lateral shifting of their quadrants of illumination, so that they do not cross over one another about the axis 5—5, but are spread apart as at n, n, in Figure 6. The light is necessarily more intense about the point l, and around the centres o of the quadrants n than in other parts of the area, because each zone of illumination is made up of a series of overlapping images of the filament lying between s and t, and of course the images overlap to a much greater extent near to the centre of curvature of each of the quadrants n than near to the circumference thereof. The shading lines radiating from the points l and o indicate the intensity of illumination, the light being most intense where the lines are closest.

The pillar filament or other source of illumination need not of necessity lie entirely between the foci s and t of the upper and lower partial paraboloids respectively, but if it extends beyond the points s and t it will give a certain amount of reflected light above the horizontal line k in Figure 6.

Figure 7:
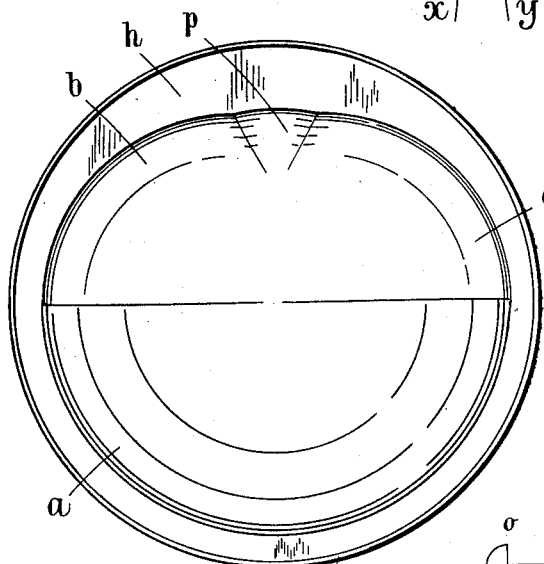
Figure 7 is a diagram similar to Figure 5 illustrating an alternative form.

In the modification shown in Figure 7, the cusp d in Figure 3 is replaced by a portion of a paraboloid p which may have its focus at s and its axis coincident with that of the lower half paraboloid a. The change which this produces in the zones of illumination is illustrated in Figure 8, where it will be seen that the sectors of illumination extending outwardly from the verticals below the points o (as indicated in dotted lines) are replaced by a central sector of illumination q extending downwardly from l. This slightly improves the central illumination without appreciably reducing the lateral illumination.

Figure 9:
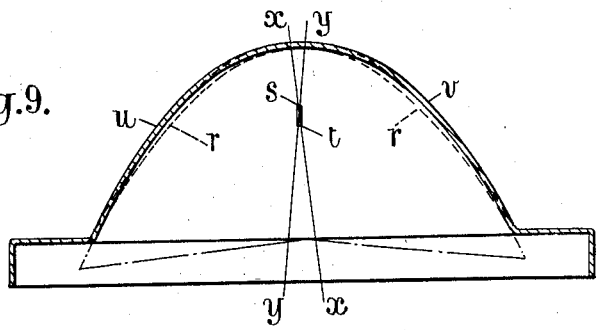
Figure 9 is a horizontal section of an alternative form of the reflector, the section being taken on or just below the horizontal axis.
Figure 10:
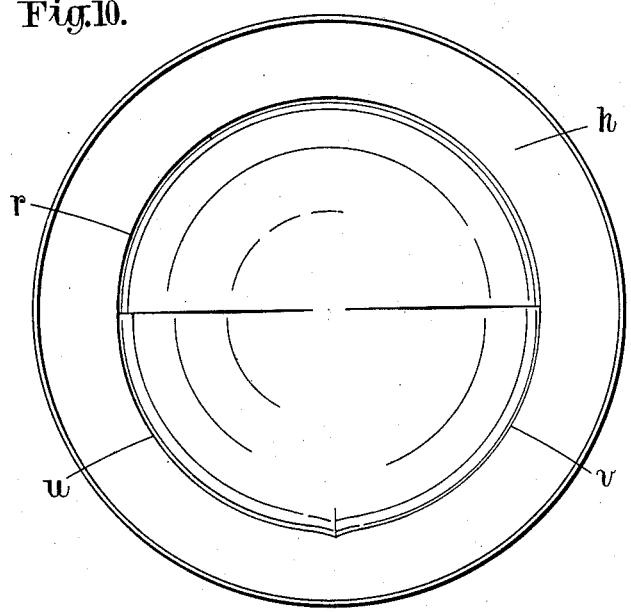
Figure 10 is a front view of the reflector according to Figure 9.

A light pattern practically identical with that of Figure 6 can be obtained from a reflector made up, as shown in Figures 9 and 10 from an upper half paraboloid r having its focus at s, and two lower partial paraboloids u and v having their foci at t, but with their axes x—x and y—y, angled inwardly so that their beams of light, which are nearly quadrant-shaped in section, are transposed in respect of the vertical axial plane, producing zones of illumination corresponding nearly to the quadrants n in Figures 6 and 8.

Figure 11:
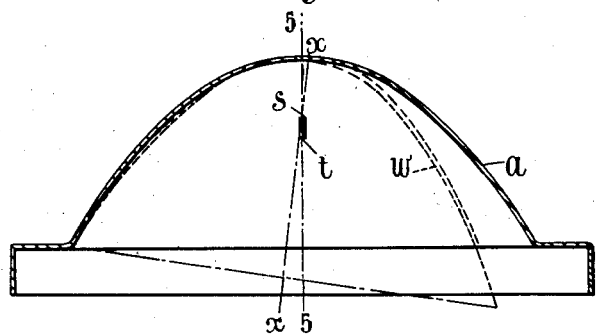
Figure 11 is a horizontal section of another form of the reflector composed of two semi-paraboloids, the one with its axis at an angle to the other.
Figure 12:
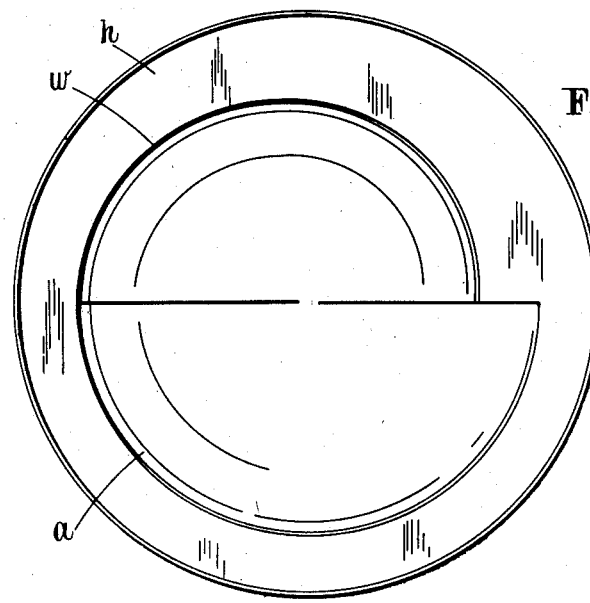
Figure 12 is a front view of the reflector according to Figure 11.
Figure 13:
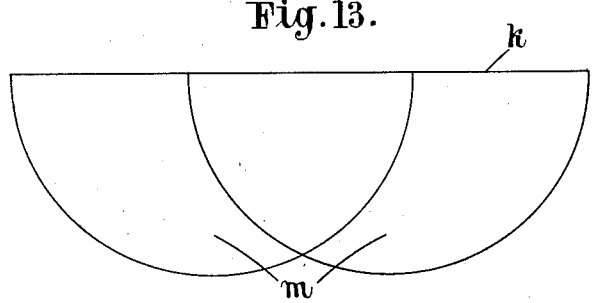
Figure 13 is a diagram showing the type of illumination resulting from the reflector according to Figures 11 and 12.
Figure 14:
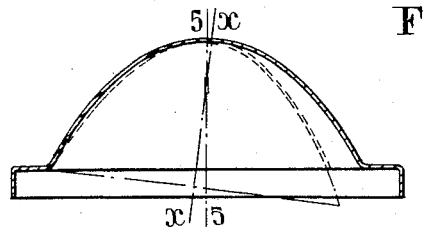
Figure 14 is a horizontal section showing the use of a pair of reflectors of the kind shown in Figure 11.
Figure 14:
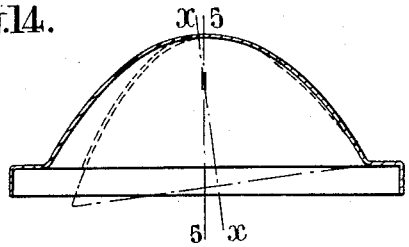

In Figures 11 and 12 a form of reflector is shown having a lower half paraboloid a as in Figures 1 to 5, with its focus at t, combined with an upper half paraboloid w with its focus at s but its axis x—x at an angle to the central axis 5—5 of the lower half paraboloid. Such a reflector gives substantially two semi-circles of illumination m laterally displaced with respect to one another as in Figure 13. If now two head lamps of this type are used on a motor vehicle for example as shown in Figure 14 in one of which the upper reflecting surface $w$ has its axis $x$—$x$ at an angle toward the right and in the other it is at an angle toward the left, while the axes of the lower reflecting surfaces $a$ of the two lamps are parallel the lower reflecting surfaces $a$ will give two practically superposed semi-circles of light on a distant screen, while the upper reflecting surfaces $w$ will give semi-circles of light one at either side of the centre, and there will be three zones of intense illumination close below the horizontal line $k$, the one at the centre being the most intense because it is the reflected light from two half paraboloids, while those at each side are rather less intense, because each emanates from one half paraboloid. If the axes 5—5 of the lower paraboloids $a$ of the two lamps are not quite parallel but are angled either outwardly or inwardly to a slight extent, the centres of their semi-circles of illumination will not coincide, and the effect will approximate more closely to that of a horizontal bar of light under the line $k$ made up of four centres of intense illumination side by side.

Figure 15:
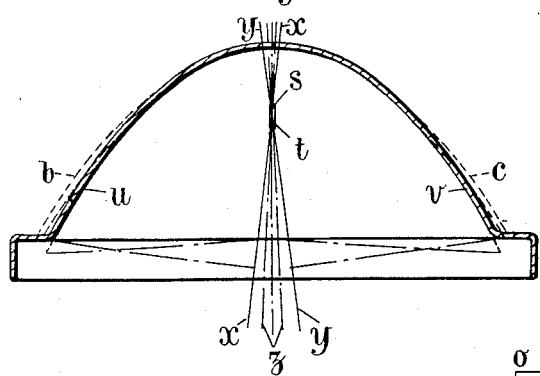
Figure 15 is a horizontal section.
Figure 17:
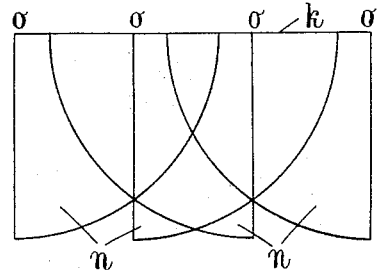
Figure 17 is a diagram showing the type of illumination resulting from the reflector according to Figures 15 and 16.
Figure 16:
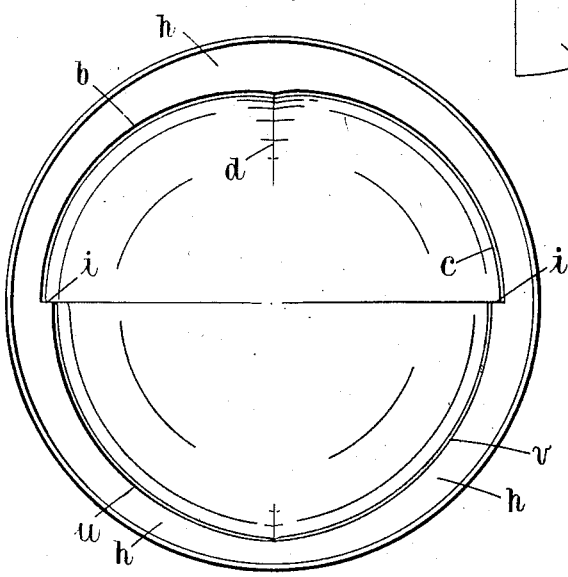
Figure 16 is a front view of another form of the reflector.

Figures 15 and 16 show a reflector made up of upper partial paraboloids $b$, $c$, angled outwardly with respect to their focus $s$ as in Figures 1 to 5, and two lower partial paraboloids $u$, $v$, angled inwardly with respect to their focus $t$, as in Figures 9 and 10, but to a less angle from one another as indicated by the axial lines $z$, $z$, in Figure 15. Each quarter paraboloid produces substantially a quadrant of illumination $n$ as indicated in Figure 17, the outer quadrants being those due to the surfaces $b$, $c$, while the inner quadrants are those due to the surfaces $u$ and $v$. This gives, from one reflector, beams of light having zones of maximum intensity at and below the four centres $o$ of the quadrants $n$, while the overlapping of all the quadrants at the centre insures good illumination in the middle zone beneath the horizontal line $k$. There is a shoulder or joggle at $i$ where the upper and lower partial paraboloids are connected, and a flange $h$ is shown at the front of the reflector in Figure 16 providing a circular outline for engagement in a lamp casing as in Figure 2 for example.

Figure 18:
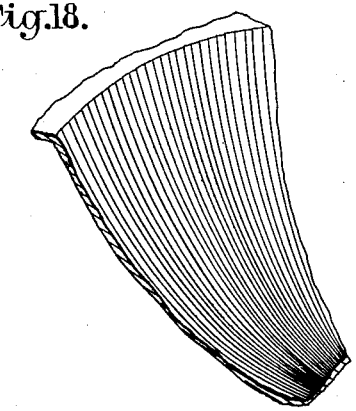
Figure 18 is a detail view showing a fragment of another type of surface approaching a paraboloidal surface.

Figure 18 shows a fragment of a reflecting surface made up of a succession of facets tangential to a paraboloid, or forming a sort of fluted paraboloid. A reflecting surface so made up may be used instead of any one of the surfaces $a$, $b$, $c$ in Figures 1 to 7 or $r$, $u$, $v$ in Figures 9 and 10 or $a$, $w$ in Figures 11 and 12 or $b$, $c$, $u$ in Figures 15 and 16; in fact, this and any other slight modification of a paraboloid such as those referred to in the introduction to this specification, may be used for any of the reflecting surfaces of which the reflectors according to this invention are made up, and as already stated the appended claims are to be construed to include such forms of surfaces. The field of illumination in such cases will, in practice, be substantially the same as those illustrated and described for true paraboloids.

A reflector made in the manner hereinbefore described will preferably be comparatively shallow in depth as is the case in the reflectors illustrated in the drawings, and the direct light from the filament will give a sufficient illumination on all sides to illumine adequately bridges, overhanging trees, and so forth.

Having thus described my invention what I claim as new and desire to secure by Letters Patent is:—

1. In a reflector for lamps projecting a beam of light, the combination of a substantially paraboloidal surface extending above the source of illumination of the lamp and having a focus substantially at the rear end of said source of illumination and a substantially paraboloidal surface extending below said source of illumination and having a focus at substantially the front end of said source of illumination, said paraboloidal surfaces being set with their axes in the horizontal plane but with an axis of said upper surface set at an angle to an axis of said lower surface.

2. In a reflector for lamps projecting a beam of light, the combination of a pair of upper reflecting surfaces consisting of substantially partial paraboloids and a lower reflecting surface of substantially paraboloidal form, said surfaces being set with their axes all in the horizontal plane, but with the axes of the upper surfaces inclined to an axis of the lower surface, and with the foci of the surfaces located upon the axis of the reflector but with the focus of the upper surfaces to the rear of that of the lower surface.

3. In a reflector for lamps projecting a beam of light, the combination of a substantially paraboloidal surface extending above the source of illumination of the lamp and a substantially paraboloidal surface extending below the source of illumination, said surfaces being set with their axes substantially in the horizontal plane, but with an axis of said upper surface inclined to an axis of said lower surface, and with the focus of the upper surface substantially at the rear end of the source of illumination of the lamp.

4. In a reflector for lamps projecting a beam of light, the combination of a plurality of upper reflecting surfaces having substantially the form of partial paraboloids set with their foci substantially at the rear end of the source of illumination of the lamp and a lower substantially paraboloidal reflecting surface set with a focus substantially at the front end of said source of illumination, said reflecting surfaces being all set with their axes substantially in the horizontal plane but with the axes of the upper reflecting surface inclined to an axis of the lower reflecting surface.

5. In a reflector for lamps of the class set forth, the combination of upper and lower substantially paraboloidal reflecting surfaces joined in a horizontal plane also containing the source of illumination of the lamp, said surfaces being set with their axes in said horizontal plane, but with an axis of said upper reflecting surface inclined to an axis of said lower reflecting surface, and with a focus of said lower reflecting surface substantially at the front end of the source of illumination of the lamp.

6. In a reflector for use in lamps of the class set forth, the combination of upper and lower parts substantially of paraboloidal form meeting in a horizontal plane, said parts being set with the upper part having a focus substantially at the rear end of a concentrated source of light of the lamp lying along the main axis of the reflector and the lower part being set with a focus substantially at the front end of said source of light with the axes of the upper and lower parts lying in the said horizontal plane, but at an angle to each other.

7. A reflector for use in lamps of the class set forth, comprising upper and lower parts meeting in a horizontal plane, one of said parts comprising a plurality of partial paraboloids, said parts being set with their axes in the said horizontal plane, with the axis of the one partial paraboloid inclined to the axis of the other partial paraboloid and with the focus of one of said parts substantially at the rear end of a concentrated source of light of the lamp lying along the main axis of the reflector and with the focus of the other of said parts substantially at the front end of said source of light.

8. A reflector for use with lamps of the class set forth, comprising in combination one part of substantially paraboloidal form set with a focus approximately at one end of the source of light in the lamp and the other part consisting of two partial paraboloids with their foci approximately at the other end of said source of light, said parts being set with their axes in the same horizontal plane but with the axes of said partial paraboloids at an angle to the axis of said first named part.

9. A reflector for use in lamps of the class set forth, comprising a lower reflecting surface of substantially paraboloidal form with an axis lying in a horizontal plane and a focus substantially at the front end of the source of light of the lamp and an upper reflecting surface consisting of two partial paraboloids angularly displaced towards one side and the other with respect to the main axis of the lamp, said upper surface being set with its axis in the said horizontal plane and with a focus substantially at the rear end of said source of light.

10. A reflector for use in lamps of the class set forth, comprising a lower reflecting surface of substantially paraboloidal form with an axis lying in a horizontal plane and a focus substantially at the front end of the source of light of the lamp and an upper reflecting surface consisting of two partial paraboloids respectively angularly displaced towards one side and the other with respect to the main axis of the lamp, said two partial paraboloids being set with their axes in the said horizontal plane and with a focus substantially at the rear end of said source of light, and being disposed so as to be only approximately in register with the corners of said lower reflecting surface at the front and approximately in register at the rear with the vertex of said lower reflecting surface, leaving a ridge or joggle between the edges of said upper and lower reflecting surfaces at the intermediate portions along the sides.

11. A reflector for use in lamps of the class set forth, comprising a lower reflecting surface of substantially paraboloidal form with an axis lying in a horizontal plane and a focus substantially at the front end of the source of light of the lamp and an upper reflecting surface consisting of two partial paraboloids having their axes respectively inclined on one side and the other of the main axis of the lamp, and continued toward the centre beyond the vertical planes through their axes so as to meet at the portions thereof in front of their focus in a cusp or ridge, said upper surface being set with its axis in the said horizontal plane and with a focus substantially at the rear end of said source of light.

HAROLD WORKMAN.